US007228991B2

(12) United States Patent
Barraclough

(10) Patent No.: US 7,228,991 B2
(45) Date of Patent: Jun. 12, 2007

(54) CONDIMENT DISPENSER

(75) Inventor: James R. Barraclough, Waterbury, CT (US)

(73) Assignee: Conair Corporation, Stamford, CT (US)

( * ) Notice: Subject to any disclaimer, the term of this patent is extended or adjusted under 35 U.S.C. 154(b) by 506 days.

(21) Appl. No.: 10/768,391

(22) Filed: Jan. 30, 2004

(65) Prior Publication Data

US 2005/0167447 A1  Aug. 4, 2005

(51) Int. Cl.
*B67D 5/06* (2006.01)

(52) U.S. Cl. .................... 222/144.5; 222/63; 222/144; 222/333

(58) Field of Classification Search ................ 222/144, 222/144.5, 94, 132, 136, 63, 142.6, 333, 222/367–368, 370, 548, 450–452
See application file for complete search history.

(56) References Cited

U.S. PATENT DOCUMENTS

| | | | | |
|---|---|---|---|---|
| 2,141,337 A | * | 12/1938 | Bailey | 366/182.3 |
| 2,655,288 A | * | 10/1953 | Caretto | 222/142.3 |
| 2,772,032 A | * | 11/1956 | Pattillo | 222/330 |
| 2,877,937 A | * | 3/1959 | Weir | 222/452 |
| 3,279,655 A | * | 10/1966 | Isserlis | 222/168 |
| 3,767,087 A | * | 10/1973 | Shannon | 222/144.5 |
| 4,288,006 A | * | 9/1981 | Clover, Jr. | 222/42 |
| 5,062,547 A | * | 11/1991 | Zahner et al. | 222/144.5 |
| 5,626,260 A | * | 5/1997 | Waldner | 222/144 |
| 5,997,220 A | * | 12/1999 | Wormser | 406/66 |
| 6,283,339 B1 | * | 9/2001 | Morrow | 222/452 |

* cited by examiner

*Primary Examiner*—Frederick C. Nicolas
(74) *Attorney, Agent, or Firm*—Lawrence Cruz

(57) ABSTRACT

A device for dispensing having a vessel having a cover at a first end and having a second end is provided. A longitudinal separator is positioned in the vessel that has an annular channel extending therethrough. The device provides for a first dial rotatably connected to the second end and having a central recess, a central hole and an first eccentric hole, a second dial received in the recess and having a second central hole in registration with the first hole, and a second eccentric hole capable of being in registration with the first eccentric hole. The device has a rotatable shaft extending through the cover, the channel, the first central hole and fixable in the second central hole for selectively providing registration between the first eccentric hole and the second eccentric hole. The dispenser is usable in a variety of appliances such as ice cream makers or coffee-related device.

3 Claims, 5 Drawing Sheets

CONDIMENT DISPENSER

BACKGROUND OF THE INVENTION

1. Field of the Invention

The present invention relates to an apparatus for selecting and dispensing condiments. More particularly, the present invention relates to an apparatus for allowing a user to select a condiment and evenly dispense the condiment.

2. Description of Related Art

Condiment dispensers are available in a variety of forms. They can be as simple as caddies, that hold a condiment for a food operator, or more advanced as the pumps often seen in fast food restaurants. Condiment dispensers are as ubiquitous as salt and pepper shakers. While these condiment dispensers are often used, they do not provide the even dispensing of a condiment that is often desired.

Such condiment dispensers like those for consumer use must have minimal parts, be very safe and easy to use.

Therefore, there exists a need for a condiment dispenser that automatically and evenly dispenses the condiment itself or dispenses the condiment into a bin.

SUMMARY OF THE INVENTION

It is an object of the present invention to provide a condiment dispenser.

It is another object of the present invention to provide a condiment dispenser that provides for selection of a particular condiment.

It is still another object of the present invention to provide a condiment dispenser that provides even dispensing of a selected condiment.

It is yet another object of the present invention to provide a condiment dispenser that provides automatic dispensing of a selected condiment.

It is a further object of the present invention to provide a condiment dispenser that evenly dispenses the condiment itself or evenly dispenses the condiment into a bin to be mixed with another condiment, food item or the like.

The above and other objects, advantages, and benefits of the present invention will be understood by reference to following detailed description and appended sheets of drawings.

DETAILED DESCRIPTION OF THE INVENTION

Figure 1:
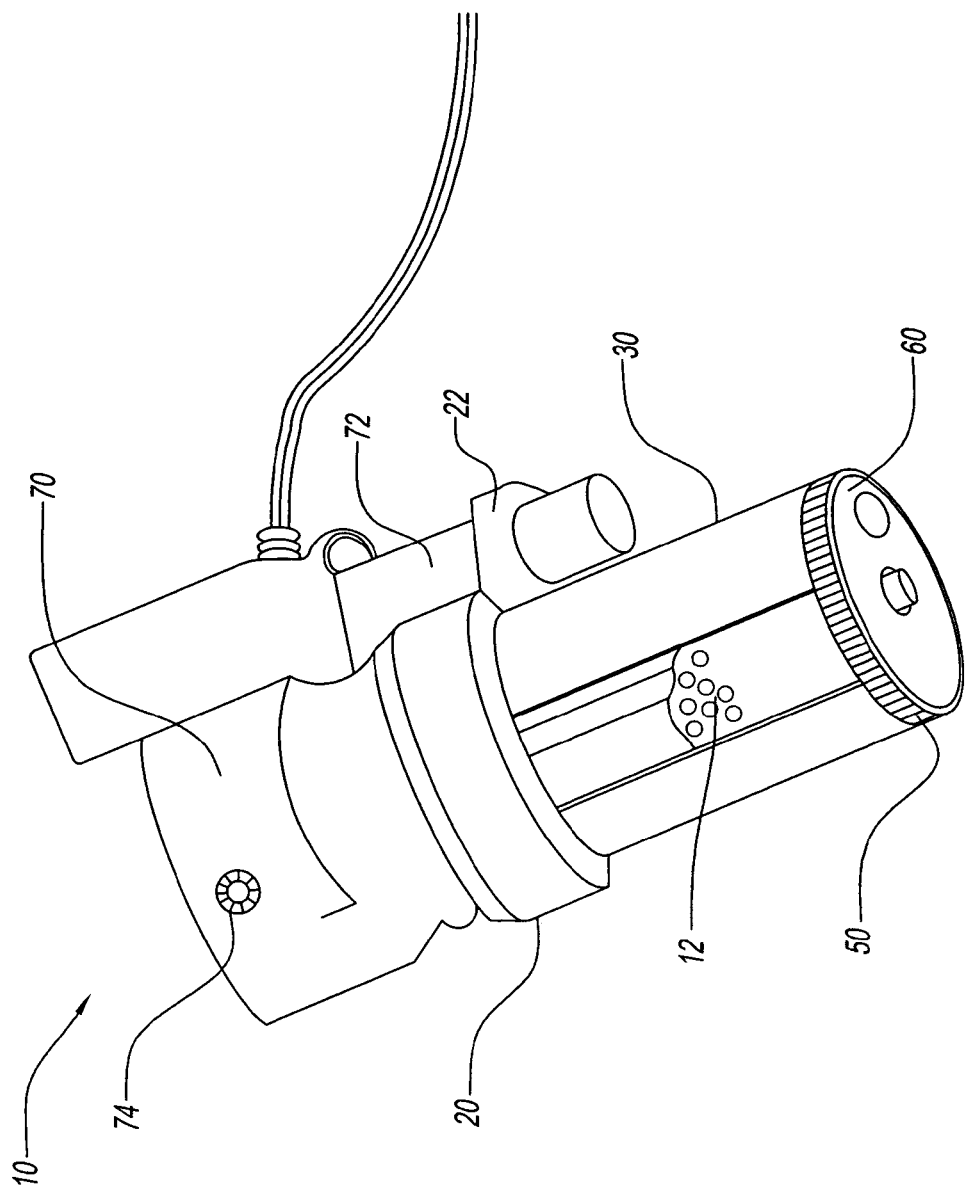
FIG. 1 is a perspective view of the condiment dispenser of the present invention.
Figure 2:
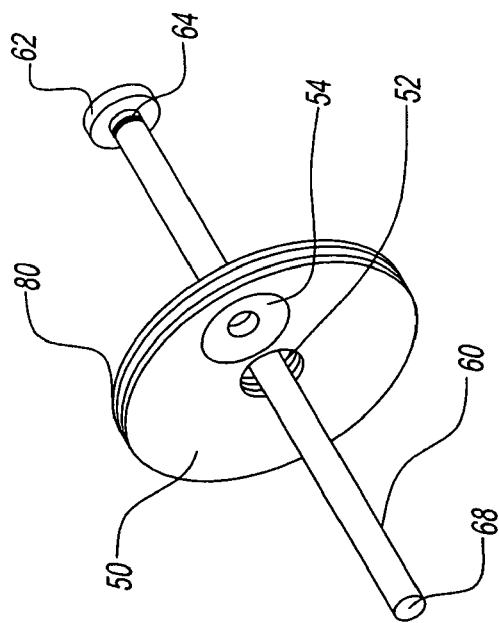
FIG. 2 is an exploded view of the condiment vessel and dials of the dispenser of FIG. 1.
Figure 2:
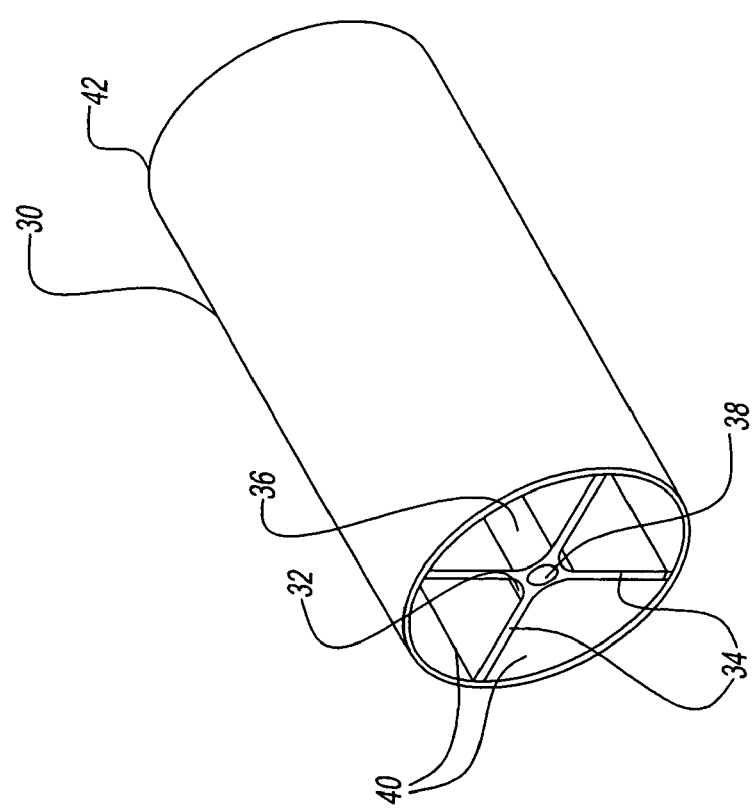

Referring to the figures, and more particularly to FIGS. 1 and 2, a condiment dispenser according to the present invention is generally designated by reference numeral 10. Dispenser 10 has a cover 20 and a vessel 30 removably connectable the cover 20. The vessel 30 has a selection dial 50. A dispensing dial 80 is preferably positioned in selection dial 50. Dispenser 10 also has a motor assembly housing 70 housing a motor therein, to which the vessel cover 30 is removably connected.

The vessel cover 20 is connected to a motor housing assembly 70. Preferably, this connection is a snap-fit connection, or any such connection that will alert the user that vessel cover 20 is securely fitted to motor housing assembly 70. The vessel cover 20 has a safety hole 22 into which a post 72 from motor housing assembly 70 extends to provide an additional positive connection to motor housing assembly 70.

The condiment vessel 30 is preferably cylindrically shaped. Also, condiment vessel 30 is preferably rotationally connected to vessel cover 20. In this embodiment, condiment vessel 30 can have threads on its outer surface to mate with corresponding threads on the inner surface of vessel cover 20. Alternatively, condiment vessel 30 can have a partial lip that protrudes and engages corresponding slots in vessel cover 20. Preferably, vessel cover 20 and vessel 30 are both transparent so that the contents in the condiment vessel 30 can be easily viewed by a user.

Motor housing assembly 70 is preferably made of a plastic material, for example acrylonitrile-butadiene styrene (ABS), or any such plastic material commonly used for household appliances. Alternatively, motor housing assembly 70 can be made from stainless steel, brushed aluminum, or at least have an outer surface made of stainless steel or brushed aluminum. Preferably, vessel cover 20 and condiment vessel 30 are preferably made of glass or a strong plastic, for example polycarbonate, although other similar plastics commonly for household appliances could also be used.

Figure 3:
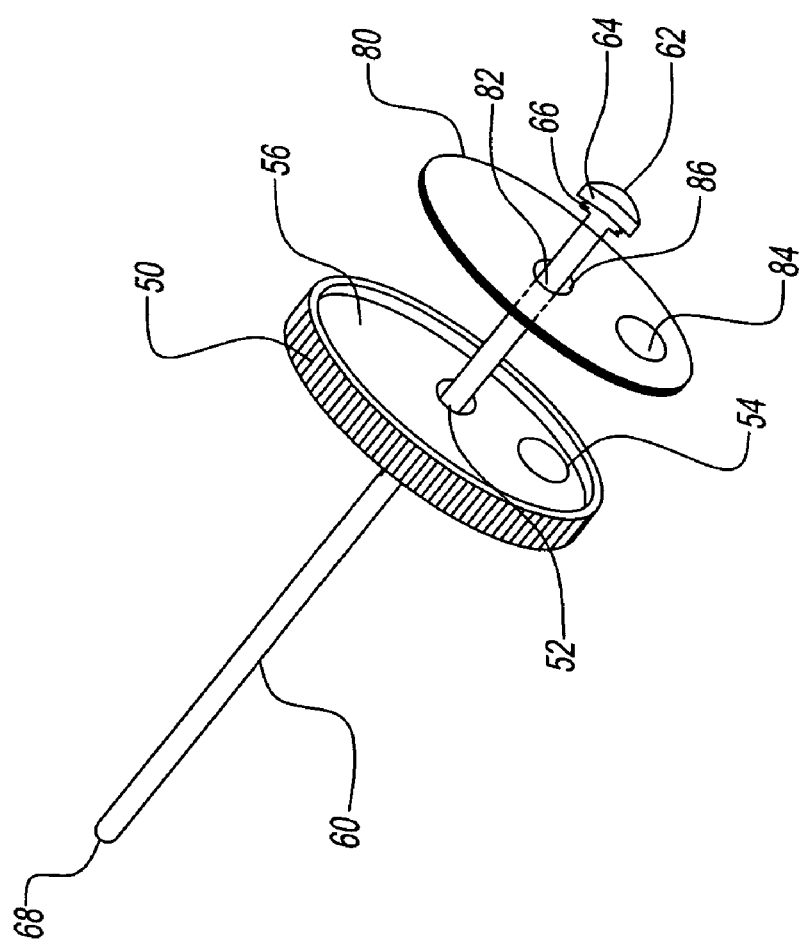
FIG. 3 is an exploded view of the dials of the dispenser of FIG. 1.

Referring to FIGS. 2 and 3, condiment vessel 30 has a separator 32 that extends the entire length of the condiment vessel 30. The separator 32 has a central portion 36 with an annular channel hollow 38 that is sized to receive a shaft 60 in sliding rotation during operation of the dispenser 10. Central portion 36 preferably has at least four vanes or fins 34 extending radially therefrom that divide the condiment vessel 30 into a number of compartments 40. The separator 32 remains stationary inside of condiment vessel 30 during operation of condiment dispenser 10.

The selection dial 50 preferably abuts or preferably slidingly received over an outer end 42 of condiment vessel 30. The selection dial 50 receives shaft 60 that freely rotates in a central hole 52. Selection dial 50 has a selection hole 54 that is sized to accept the contents 100 of condiment vessel 30. A user can rotate selection dial 50 over outer end 42 of condiment vessel 30 to change the location of selection hole 54 to correspond to a particular compartment 40 in condiment vessel 30. Selection dial 50 has a recessed portion 56 that slidingly accepts a dispenser dial 80. Dial 80 has a central hole 82 that has internal threads 86 and a dispenser hole 84 that can lie in registration with selection hole 54 of selection dial 50. When selection dial hole 54 is beneath a particular compartment 40, and in registration with dispenser hole 84, the contents will be released from dispenser 10.

Condiment vessel 30 also has or is adapted to receive a shaft 60. The shaft 60 has a proximal end 68 and a distal end 62. The proximal end 68 is operatively connected to motor shaft (not shown) of the motor housing in motor housing 70. When different components of the condiment dispenser 10 are disassembled, shaft 60 can be disconnected from the motor assembly. The distal end 62 of shaft 60 has a knob 64 located that lies beneath dispenser dial 80. On shaft 60, proximate knob 64, are external threads 66 that mate with the internal threads of hole 82 to allow shaft 60 and dispenser dial 80 to move as a single unit when dispenser 10 is energized.

The present invention also contemplates different pairings of selection dial 50 and dispenser dial 80 that have holes of varied but corresponding size depending on the condiment that is to be dispensed. For example, dispensing cookie pieces would require larger holes 54 and 84 of respective dials than sprinkles or sauces would require. Furthermore, the smaller dispenser holes may optionally have a spout attachment.

The motor assembly housing 70 houses the motor (not shown), a gear reduction assembly and a motor shaft (not shown). The motor is connected to proximal end 68 of shaft 60 to impart, preferably a constant rotational movement to dial 80, which freely rotates in selection dial recess 56. The motor provides a constant rotation of dial 80, as it passes the stationary selection dial hole 54 located beneath a particular compartment 40. By rotating at a constant rate, dial 80 will cause a dispensing or dispenser hole 84 to pass fixed selection dial hole 54 at a constant rate. The constant rate provides even dispensing of the condiment into a bin containing another food, such as ice cream or bread, that may continue to be mixed or that may be concurrently dispensed. Also, the even dispensing of the condiment allows a constant volume of condiment to be dispensed during each rotation of dial 80.

The motor is preferably an electrically powered motor that is supplied with AC power from a socket or battery powered in a convention manner. The speed of the motor is adjustable using setting knob 74 on the outer surface of housing 70. The speed can be adjusted depending on the condiment to be dispensed, the frequency or rate of dispensing, and the amount of condiment to be dispensed during each dial rotation.

In operation, condiment dispenser 10 can be used to dispense condiments into a funnel to be mixed with another food such as soft-serve ice cream or bread. Before filling any of the compartments 40, the user may ensure that selection hole 54 and dispenser hole 84 were not in registration to prevent an inadvertent spilling of the condiments. The user can remove vessel cover 20 and condiment vessel 30 including shaft 60, dials 50, and 80, from the motor assembly housing 70. The user may fill all except one of the compartments 40 with condiments 12. The condiments 12 can be large condiments or toppings such as ground nuts, cookie pieces, raisins or ice cream and the condiments can be very small such as cake sprinkles or even sauces. The user can rotate selection dial hole 54 to be beneath compartment 40 containing the particular condiment 12 to be used. Selection dial 50 remains stationary throughout the operation of dispenser 10.

Figure 4:
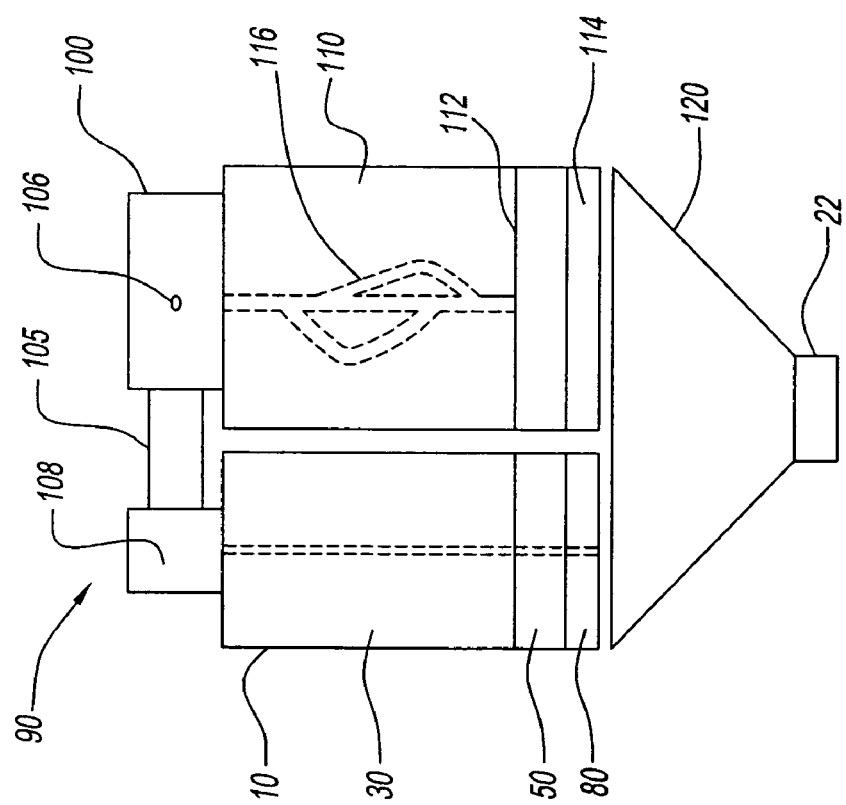
FIG. 4 is front plan view of an exemplary embodiment of the present invention incorporated into an ice cream maker.

Referring to FIG. 4, in a further embodiment, condiment dispenser 10 can be incorporated in an ice cream maker 90. Ice cream maker 90 has a motor assembly 100, an ice cream mixing bowl 110 and a funnel 120. Mixing bowl 110 receives ingredients for making ice cream. In this embodiment, condiment dispenser 10 operates as discussed above, except that shaft 60 is preferably energized by motor assembly 100. Motor assembly 100 is preferably operatively connected to a shaft in mixing bowl 110, a selector dial 112 and a dispenser dial 114 to dispense ice cream. Selector dial 112 and dispenser dial 114, each have respective eccentric holes that can be brought into registration during dial 114 rotation. The motor assembly 100 has a motor (not shown) that is operatively connected to a gear system that turns both shaft 60 and a churner 116 in mixing bowl 110. The gear system is capable of turning shaft 60 and churner 116 at different rates to provide proper dispensing of the condiments and the ice cream.

In the embodiment of FIG. 4, the motor speed can be controlled by an adjustment knob 106 preferably located on motor assembly 100. Depending upon the condiment used and other factors, the rate of rotation of shaft 60 can be varied. For example, if the user wants to move dial 50 to be beneath a different compartment 40, the speed of rotation may also have to be adjusted. Similar to the embodiment of FIG. 1, an even rate of rotation of the dial 80 will allow even dispensing of the condiment into funnel 120. Concurrently, the dispenser dial 114 will also provide even dispensing of ice cream into the funnel 120. Proper mixing in funnel 120 will ensure an even distribution of condiments throughout the ice cream when it flows from a nozzle 122.

Figure 5:
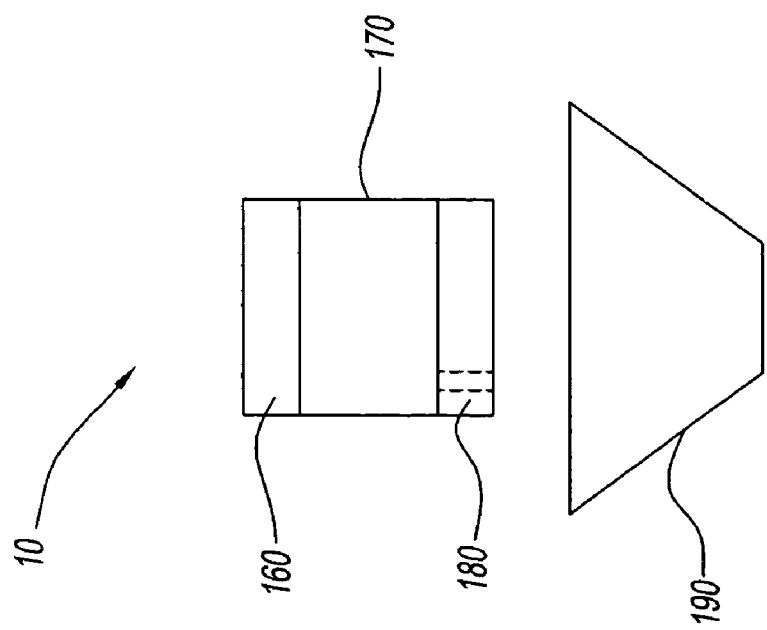
FIG. 5 is a front plan view of a exemplary second embodiment of present the invention incorporated into a coffee machine.

Referring to FIG. 5, which is another embodiment of the present invention, condiment dispenser 10 can be incorporated in a coffee grinder 150. In this embodiment, a selector dial 160 and a dispenser dial 180 are preferably not adjacent. They are separated by a ground coffee hopper 170. Selector dial 160 is operatively connected to ground coffee hopper 170 and a central shaft thereof (not shown) is operatively connected to dispenser dial 180. Hopper 170 is divided into a number compartments by a separator. Dispenser dial 180 has an eccentric dispenser dial hole 182 to release contents of a compartment into a brew basket 190. The user can rotate selector dial 160 with hopper 170 to be above a brew basket 190. Dispenser dial hole 182 will not be located beneath the basket to prevent in advertent spills. When the motor (not shown) of this embodiment is energized, the selected compartment and dispenser dial hole 182 will be brought in registration to dispense the ground coffee into a brew basket 190.

Figure 6:
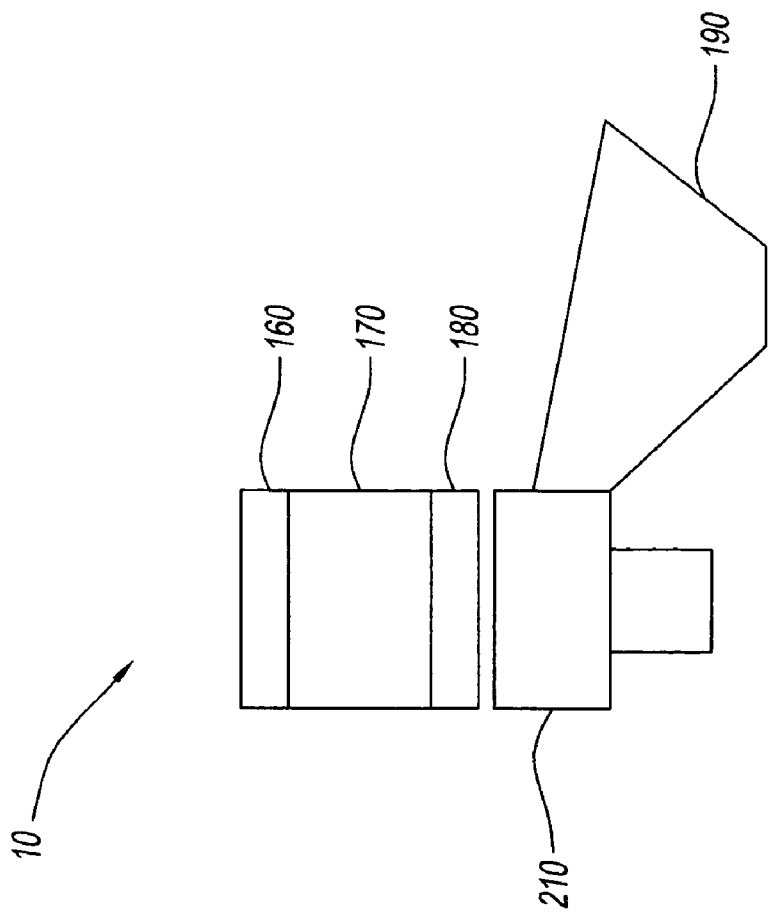
FIG. 6 is a front plan view of as alternative embodiment of the invention of FIG. 5.

Referring to FIG. 6, in a still further embodiment, the condiment dispenser 10 can be incorporated into a coffee grinder. This embodiment operates, in a similar fashion to the embodiment of FIG. 5. However, in this embodiment, the hopper contains beans and a grinding chamber 210 is located beneath the dispenser dial 180 to grind the selected bean that is to drop in to brew basket 190.

While the present invention has been described with reference to one or more exemplary embodiments, it will be understood that various changes may be made and equivalents may be substituted for elements thereof without departing from the scope of the present invention. In addition, many modifications may be made to adapt a particular situation or material to the teachings of the disclosure without departing from the scope thereof. Therefore, it is intended that the present invention not be limited to the particular embodiment(s) disclosed as the best mode contemplated for carrying out this invention, but that the invention will include all embodiments falling within the scope of the appended claims.

What is claimed is:

1. A device comprising:

a vessel having a cover at a first end and having a second end;

a longitudinal separator, in said vessel, having an annular channel extending therethrough and a number of longitudinal radially extending vanes dividing said vessel into a number of compartments;

a pair of dials, each dial of said pair of dials having an eccentric hole therethrough; and a rotatable shaft extending through said cover, said annular channel and said pair of dials for selectively providing registration between said eccentric holes, wherein said pair of dials comprises:

a first dial rotatably connectable to said second end and further comprising a first central recess, a first central hole therethrough; and a second dial slidingly received in said first central recess and further comprising a second central hole in registration with said first central hole.

2. A device comprising:

a vessel having a cover at a first end and having a second end;

a longitudinal separator, in said vessel, having an annular channel extending therethrough and a number of longitudinal radially extending vanes dividing said vessel into a number of compartments;

a pair of dials, each dial of said pair of dials having an eccentric hole therethrough;

a rotatable shaft extending through said cover, said annular channel and said pair of dials for selectively providing registration between said eccentric holes;

a motor assembly housing removably connected to said cover; and an adjustment knob for controlling said motor, wherein said housing has a motor operatively connected to said shaft.

3. A device comprising:

a vessel having a cover at a first end and having a second end;

a longitudinal separator, in said vessel, having an annular channel extending therethrough and a number of longitudinal radially extending vanes dividing said vessel into a number of compartments;

a pair of dials, each dial of said pair of dials having an eccentric hole therethrough;

a rotatable shaft extending through said cover, said annular channel and said pair of dials for selectively providing registration between said eccentric holes; and a motor assembly housing removably connected to said cover, wherein said housing has a motor operatively connected to said shaft and wherein said shaft is operatively connected to said motor for selectively controlling the rate of rotation of said second dial.

* * * * *